United States Patent
Zhu

(10) Patent No.: US 12,028,172 B2
(45) Date of Patent: Jul. 2, 2024

(54) METHOD AND DEVICE FOR SCHEDULING HYBRID AUTOMATIC REPEAT REQUEST

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 425 days.

(21) Appl. No.: 17/427,577

(22) PCT Filed: Feb. 1, 2019

(86) PCT No.: PCT/CN2019/074452
§ 371 (c)(1),
(2) Date: Jul. 30, 2021

(87) PCT Pub. No.: WO2020/155109
PCT Pub. Date: Aug. 6, 2020

(65) Prior Publication Data
US 2022/0123876 A1    Apr. 21, 2022

(51) Int. Cl.
H04W 4/00      (2018.01)
H04L 1/1867    (2023.01)
H04L 5/00      (2006.01)

(52) U.S. Cl.
CPC .......... *H04L 1/1887* (2013.01); *H04L 5/0055* (2013.01)

(58) Field of Classification Search
CPC ... H04L 1/1887; H04L 5/0055; H04L 1/1854; H04L 1/1896; H04L 1/1685; H04W 72/23

USPC ................................................. 370/329, 330
See application file for complete search history.

(56) References Cited

U.S. PATENT DOCUMENTS

| 10,383,103 | B2 | 8/2019 | Park et al. |
| 2016/0227425 | A1 | 8/2016 | Kim et al. |
| 2018/0124749 | A1 | 5/2018 | Park et al. |
| 2020/0220693 | A1* | 7/2020 | Babaei ............... H04L 5/0044 |

(Continued)

FOREIGN PATENT DOCUMENTS

| CN | 105530647 A | 8/2016 |
| CN | 107667565 A | 2/2018 |

(Continued)

OTHER PUBLICATIONS

International Search Report of PCT Application No. PCT/CN2019/074452 dated Oct. 31, 2019 with English translation, (4p).

(Continued)

*Primary Examiner* — Chuong T Ho
(74) *Attorney, Agent, or Firm* — Arch & Lake LLP

(57) ABSTRACT

The present disclosure provides a method and a device for scheduling a hybrid automatic repeat request. The method includes: transmitting downlink data to user equipment (UE) in a first channel occupation time; and transmitting a trigger instruction to the UE in a second channel occupation time, in which the trigger instruction is configured to instruct the UE to feed back a reception result about the downlink data in the second channel occupation time, and the trigger instruction includes at least one of identifier information of the first channel occupation time, and channel detection mechanism information of transmitting the reception result.

20 Claims, 13 Drawing Sheets

---

101 — transmitting a scheduling instruction to the UE in the first channel occupation time, in which the scheduling instruction is configured to instruct the UE to receive the trigger instruction in the second channel occupation time 102 — transmitting downlink data to the UE in the first channel occupation time 103 — transmitting a trigger instruction to the UE in the second channel occupation time, in which the trigger instruction is configured to instruct the UE to feed back the reception result about the downlink data in the second channel occupation time

(56) References Cited

U.S. PATENT DOCUMENTS

2020/0245357 A1\* 7/2020 Cui .................... H04L 27/0006
2020/0252948 A1\* 8/2020 Cui .................. H04W 74/0808
2020/0382260 A1\* 12/2020 Lin ...................... H04L 1/1861
2021/0075579 A1\* 3/2021 Liu ...................... H04L 5/0098

FOREIGN PATENT DOCUMENTS

| CN | 108401486 A | 8/2018 |
|----|-------------|--------|
| WO | 2016163709 A1 | 10/2016 |

OTHER PUBLICATIONS

Mediatek Inc., "Enhancements on HARQ for NR-U Operation", 3GPP TSG RAN WG1 Meeting #94bis R1-1810444, Oct. 12, 2018, (xp).

Spreadtrum Communications, "Consideration on HARQ Enhancements in NR-U", 3GPP TSG RAN WG1 Meeting #94, R1-1808811, Aug. 24, 2018, (xp).

VIVO, "Discussion on HARQ Operation for NR-U", 3GPP TSG RAN WG1 Meeting #95, R1-1812302, Nov. 16, 2018, (xp).

Extended European Search Report issued in EP Application No. 19913615.1, dated May 17, 2022,(8p).

Fujitsu, "Scheduling/HARQ enhancements for NR-U" 3GPP TSG-RAN WG1#Ad-Hoc Meeting 1901, R1-1900245, Taipei, Taiwan, Jan. 21-25, 2019, (5p).

INOA of Application No. 202147038827 dated on Aug. 24, 2022 with English translation,(6p).

LG Electronics. "HARQ operation for autonomous UL access" 3GPP TSG RAN WG1 Meeting 91, R1-1719864, Reno, USA, Nov. 27-Dec. 1, 2017, (4p).

\* cited by examiner

METHOD AND DEVICE FOR SCHEDULING HYBRID AUTOMATIC REPEAT REQUEST

CROSS-REFERENCE TO RELATED APPLICATION

This application is the US national phase application of International Application No. PCT/CN2019/074452, filed on Feb. 1, 2019, the entire content of which is incorporated herein by reference for all purposes.

TECHNICAL FIELD

The present disclosure relates to the field of communication technologies, and particularly to a method and a device for scheduling a hybrid automatic repeat request.

BACKGROUND

In the related art, to ensure the reliability of transmission, after a base station transmits downlink data to a user equipment (UE), the UE is required to feed back acknowledgment (ACK) and non-acknowledgment (NACK) to the base station according to a reception situation. The base station may determine whether it is necessary to retransmit data according to the feedback of the UE. For an unlicensed frequency band of a fifth generation (5G) mobile communication system, the channel occupation time is limited. Therefore, the UE may not feedback ACK/NACK in time before the end of the channel occupancy time. It is a problem to be solved how the UE feeds back ACK/NACK.

SUMMARY

According to a first aspect of the present disclosure, a method for scheduling a hybrid automatic repeat request is provided. The method is applied to a base station side, and includes: transmitting, by a base station, downlink data to a user equipment (UE) during a first channel occupation time; and transmitting, by the base station, a trigger instruction to the UE during a second channel occupation time, in which the trigger instruction is configured to instruct the UE to feed back a reception result about the downlink data during the second channel occupation time, and the trigger instruction includes at least one of identifier information of the first channel occupation time or channel detection mechanism information of transmitting the reception result.

According to a second aspect of the present disclosure, a method for scheduling a hybrid automatic repeat request is provided. The method is applied to a UE side, and includes: receiving, by a UE, downlink data transmitted by a base station during a first channel occupation time; receiving, by the UE, a trigger instruction transmitted by the base station during a second channel occupation time, the trigger instruction including at least one of identifier information of the first channel occupation time or channel detection mechanism information of transmitting a reception result; and feeding back a reception result about the downlink data during the second channel occupation time according to the trigger instruction.

According to a third aspect of the present disclosure, a device for scheduling a hybrid automatic repeat request is provided. The device includes: a processor; a memory configured to store instructions executable by the processor; in which, the processor is configured to: receive downlink data transmitted by a base station during a first channel occupation time; receive a trigger instruction transmitted by the base station during a second channel occupation time, the trigger instruction comprising at least one of: identifier information of the first channel occupation time, or channel detection mechanism information of transmitting a reception result; and feed back a reception result about the downlink data during the second channel occupation time according to the trigger instruction.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show examples in conformity with the present disclosure, and explain the principle of the present disclosure together with the specification.

DETAILED DESCRIPTION

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all the implementations consistent with the present disclosure. Rather, they are merely examples of the device and method consistent with some aspects of the present disclosure as detailed in the appended claims.

In the related art, to ensure the reliability of transmission, after a base station transmits downlink data to a user equipment (UE), the UE is required to feed back acknowledgment (ACK) and non-acknowledgment (NACK) to the base station according to the reception situation. The base station may determine whether it is necessary to retransmit data according to the feedback of the UE. For an unlicensed frequency band of a fifth generation (5G) mobile communication system, the channel occupation time is limited. Therefore, the UE may not feedback ACK/NACK in time before the end of the channel occupancy time. It is a problem to be solved how the UE feeds back ACK/NACK.

Examples of the present disclosure may achieve a hybrid automatic repeat request across channel occupation time (COT). A scheduling instruction is added, and the base station informs the UE to adopt a hybrid automatic repeat request (HARQ) across channel occupation time through the scheduling instruction.

Figure 1A:
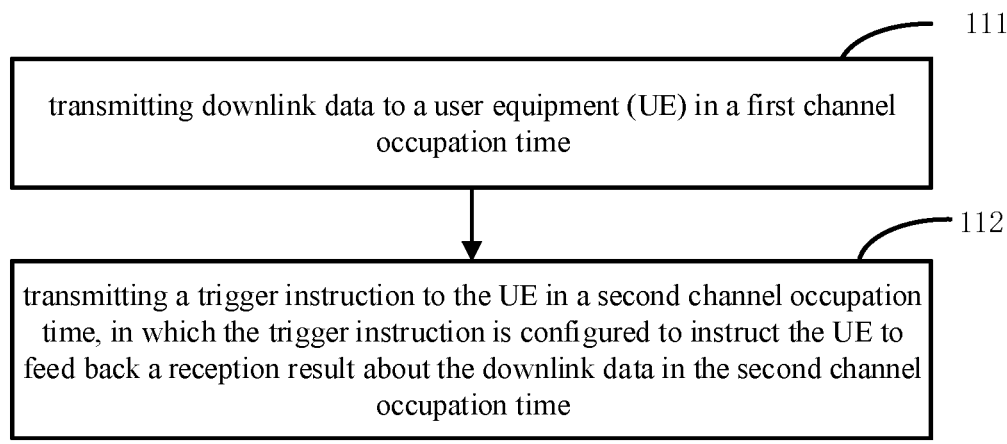
FIG. 1A is a flowchart illustrating a method for scheduling a hybrid automatic repeat request according to one or more examples of the present disclosure.

FIG. 1A is a flowchart illustrating a method for scheduling a hybrid automatic repeat request according to an example of the present disclosure. The method for scheduling a hybrid automatic repeat request is applied to an access network device such as a base station. As illustrated in FIG. 1, the method includes the following steps 111 to 112.

At step 111, downlink data is transmitted to a UE in a first channel occupation time.

At step 112, a trigger instruction is transmitted to the UE in a second channel occupation time, in which the trigger instruction is configured to instruct the UE to feed back a reception result about the downlink data in the second channel occupation time, and the trigger instruction includes at least one of identifier information of the first channel occupation time and channel detection mechanism information of transmitting the reception result.

In this example, downlink data is transmitted to the UE in the first channel occupation time, the trigger instruction is transmitted to the UE in the second channel occupation time, and the reception result fed back is received in the second channel occupation time, thereby achieving a hybrid automatic repeat request across channel occupation time. Moreover, a structure design of the trigger instruction is provided in this example, and the trigger instruction includes at least one of identifier information of the first channel occupation time and channel detection mechanism information of transmitting the reception result.

In this example, with the trigger instruction, it is possible to inform the UE the reception result corresponding to downlink data in which channel occupation time is to be fed back. The first channel occupation time and the second channel occupation time are not necessarily two continuous channel occupation time, and other channel occupation time may be provided therebetween. The trigger instruction may include identifier information of a plurality of first channel occupation time.

In this example, the trigger instruction may be configured to inform the UE of the channel detection mechanism information of transmitting the reception result. In an unlicensed frequency band, in order to observe an LBT principle, the UE needs to detect a time-frequency resource before transmitting the reception result. Adopting which channel detection mechanism may be flexibly configured by the trigger instruction, and may also be preconfigured for the UE through other signaling. The channel detection mechanism information may be channel detection mechanism identifier information or channel detection mechanism index information. Adopting the channel detection mechanism index information may save a message length. Table 1 illustrates a correspondence relationship between channel detection mechanism identifier information and channel detection mechanism index information. The base station may transmit the correspondence relationship to the UE in advance through signaling such as an RRC signaling. Then, the trigger instruction may carry only the channel detection mechanism index information.

TABLE 1

| Channel Detection Mechanism Index Information | Channel Detection Mechanism Identifier Information |
|---|---|
| 00 | Channel Detection Mechanism 1 |
| 01 | Channel Detection Mechanism 2 |
| 10 | Channel Detection Mechanism 3 |
| ... | ... |

Figure 1B:
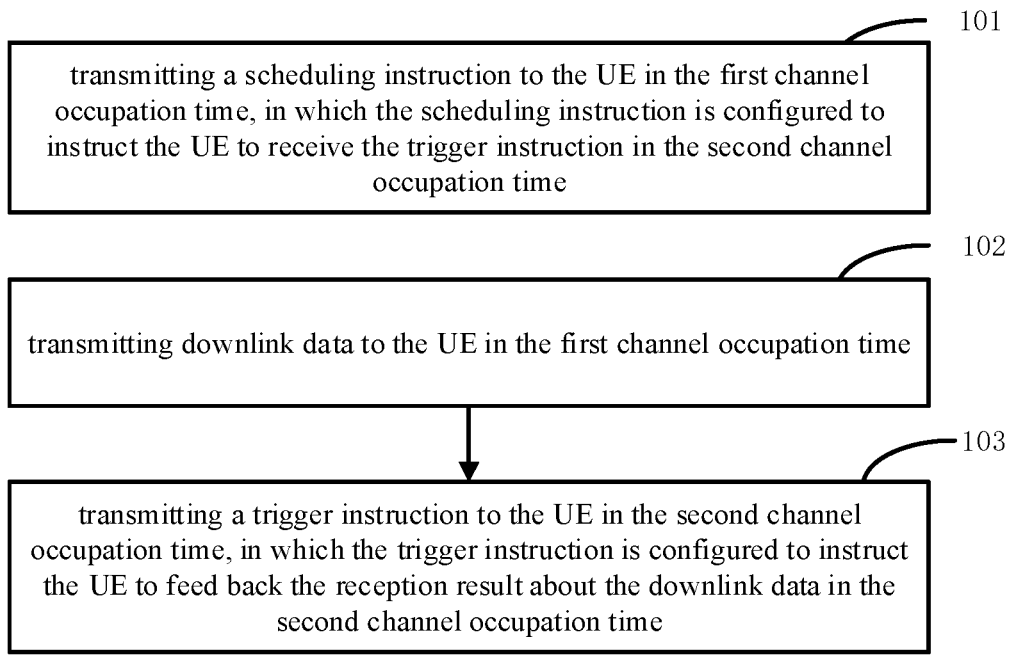
FIG. 1B is a flowchart illustrating a method for scheduling a hybrid automatic repeat request according to one or more examples of the present disclosure.

FIG. 1B is a flowchart illustrating a method for scheduling a hybrid automatic repeat request according to an example of the present disclosure. The method for scheduling a hybrid automatic repeat request is applied to an access network device such as a base station. As illustrated in FIG. 1B, the method includes the following steps 101 to 103.

At step 101, a scheduling instruction is transmitted to the UE in the first channel occupation time, in which the scheduling instruction is configured to instruct the UE to receive the trigger instruction in the second channel occupation time.

At step 102, downlink data is transmitted to the UE in the first channel occupation time.

At step 103, the trigger instruction is transmitted to the UE in the second channel occupation time, in which the trigger instruction is configured to instruct the UE to feed back a reception result about the downlink data in the second channel occupation time, and the trigger instruction includes at least one of identifier information of the first channel occupation time and channel detection mechanism information of transmitting the reception result.

Figure 2:
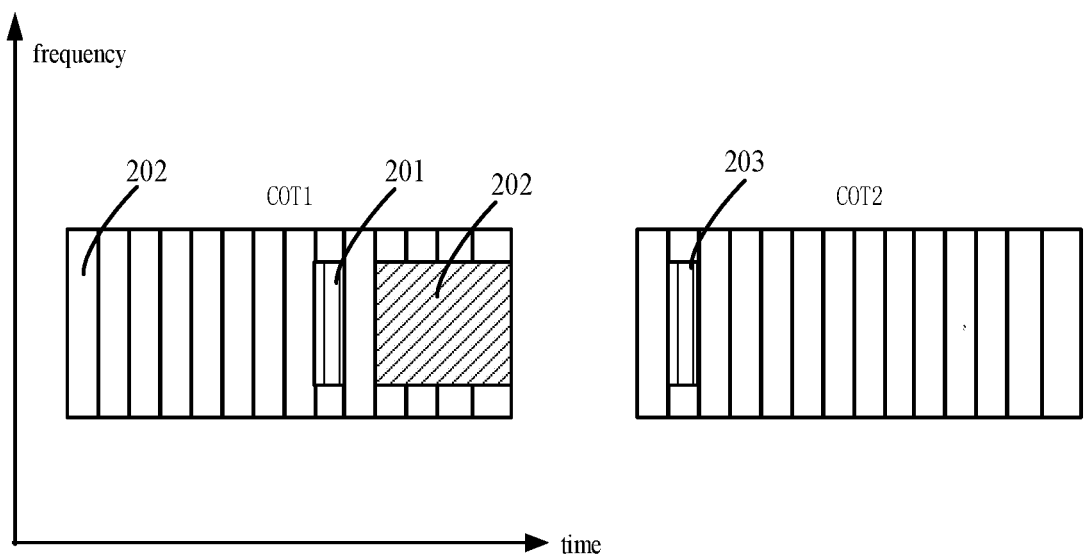
FIG. 2 is a diagram illustrating a time-frequency resource according to one or more examples of the present disclosure.

In this example, as illustrated in FIG. 2, the base station transmits downlink data in COT1 and predicts whether the UE can feed back the reception result with respect to the downlink data in COT1. For example, the end of COT1 is occupied by downlink data, therefore, the UE cannot transmit the reception result (ACK/NACK) in COT1. For another example, the base station obtains a processing ability reported by the UE in advance, and determines that the UE cannot transmit the reception result in COT1 according to the processing ability of the UE. At this time, the base station may determine to adopt an HARQ across channel occupation time. That is, before transmitting downlink data, the base station transmits the scheduling instruction 201 to the UE in COT1 and informs the UE to adopt the HARQ across channel occupation time. The scheduling instruction may be configured to instruct the UE to receive the trigger instruction in second channel occupation time. The scheduling instruction may include information of the second channel occupation time, or may not include information of the second channel occupation time. The scheduling instruction may be further configured to instruct the UE to feed back the reception result in the channel occupation time in which the trigger instruction is received. Then, the base station transmits downlink data 202 in COT1. The base station transmits the trigger instruction 203 in COT2, to instruct the UE to feed back the reception result about the downlink data in COT1 in the second channel occupation time. The trigger instruction 203 is transmitted in COT2, so that the UE may exactly know the moment that requires to feed back HARQ information.

In an example, the scheduling instruction includes at least one of a receiving mode of the trigger instruction, information of the second channel occupation time, and indication information configured to instruct the UE to feed back the reception result in the channel occupation time of receiving the trigger instruction.

In this example, the receiving mode of the trigger instruction may be flexibly configured through the scheduling instruction, so that the UE may receive the trigger instruction better.

Of course, there may be another implementation. The base station preconfigures the receiving method of the trigger instruction for the UE through a radio resource control (RRC) signaling. Or, the receiving method of the trigger instruction is agreed through a system protocol.

In an example, the receiving mode of the trigger instruction includes at least one of: an aggregation level required by receiving the trigger instruction, and a time-frequency resource position of receiving the trigger instruction and a signaling format of the trigger instruction.

In this example, the UE may start to detect the trigger instruction at the start position of the second channel occupation time. Or, the UE is informed by the scheduling instruction the time-frequency resource position of the trigger instruction, so that the UE may receive the trigger instruction at the time-frequency resource position, thereby reducing a detection duration of the UE and saving power consumption of the UE.

In this example, the UE may be informed by the scheduling instruction the aggregation level required by receiving the trigger instruction, so that the UE may receive the trigger instruction better.

There may be other information that helps the UE receive the trigger instruction, which is applicable in this example.

In an example, the method further includes: step A1 to step A2.

At step A1, before the trigger instruction is transmitted to the UE, a radio network temporary identifier (RNTI) is transmitted to the UE.

At step A2, before the trigger instruction is transmitted to the UE, the trigger instruction is scrambled with the RNTI.

In this example, the trigger instruction may be scrambled with the RNTI, to improve an anti-interference performance of the trigger instruction, so that the UE receives the trigger instruction better. In addition, the RNTI needs to be transmitted to the UE in advance through the scheduling instruction or the RRC signaling, so that the UE descrambles the trigger instruction.

There is no strict execution sequence between step A1 and step A2.

The RNTI in this example may be a public RNTI, so that the trigger instruction is suitable for a plurality of UEs, that is, the base station transmits the trigger instruction to a plurality of UEs. The plurality of UEs may be UEs in a multicast group.

In an example, the trigger instruction further includes identifier information of a downlink packet.

In this example, the UE may be informed by the trigger instruction the reception result about which downlink packet or packets needs to be fed back. The identifier information of the downlink packet may be an HARQ process identifier. The trigger instruction may include identifier information of a plurality of downlink packets. The trigger instruction carrying the identifier information of the downlink packet is suitable for a single UE.

In an example, the first channel occupation time includes one or more channel occupation time.

There may be a plurality of first occupation time in this example, that is, the UE may feed back the reception result for downlink data of a plurality of first channel occupation time in the second channel occupation time. After transmitting downlink data in COT1, the base station may predict whether there is an idle time-frequency resource in COT2 for the UE to feed back the reception result, and if no, continue to transmit downlink data. Then, the base station predicts whether there is an idle time-frequency resource in COT3 for the UE to feed back the reception result, and if yes, transmits the trigger instruction in COT3, and the UE feeds back the reception result about downlink data of COT1 and COT2 in COT3.

The following illustrates an implementation process in an example.

Figure 3:
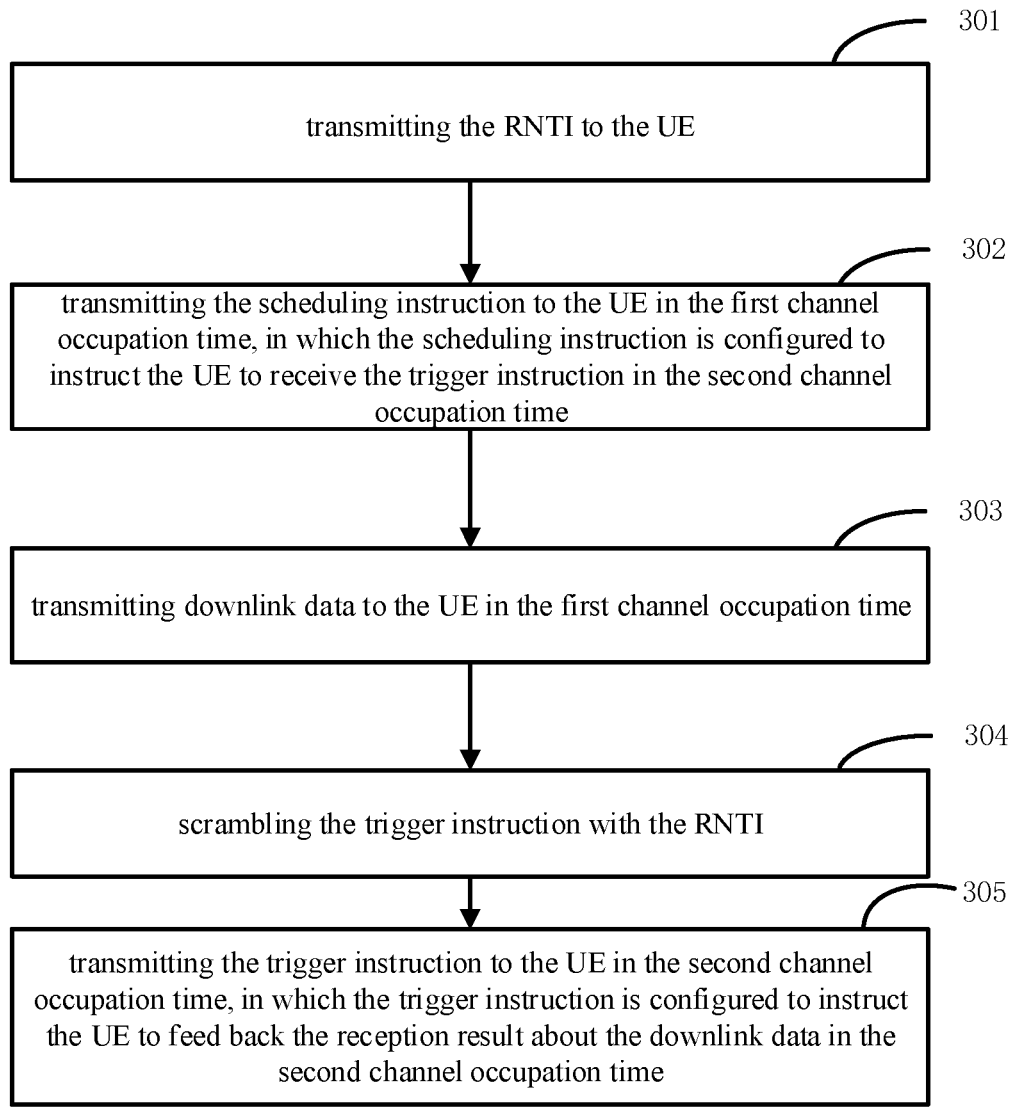
FIG. 3 is a flowchart illustrating a method for scheduling a hybrid automatic repeat request according to one or more examples of the present disclosure.

FIG. 3 is a flowchart illustrating a method for scheduling a hybrid automatic repeat request according to an example of the present disclosure. The method for scheduling a hybrid automatic repeat request is applied to an access network device such as a base station. As illustrated in FIG. 3, the method includes the following steps 301 to 305.

At step 301, the RNTI is transmitted to the UE.

At step 302, the scheduling instruction is transmitted to the UE in the first channel occupation time, in which the scheduling instruction is configured to instruct the UE to receive the trigger instruction in the second channel occupation time.

At step 303, downlink data is transmitted to the UE in first channel occupation time.

At step 304, the trigger instruction is scrambled with the RNTI.

At step 305, the trigger instruction is transmitted to the UE in the second channel occupation time, in which the trigger instruction is configured to instruct the UE to feed back the reception result about the downlink data in the second channel occupation time, and the trigger instruction includes at least one of identifier information of the first channel occupation time and channel detection mechanism information of transmitting the reception result.

The above illustrates the implementation process at the base station side, and the corresponding UE side is improved. The following is an implementation process at the UE side.

Figure 4A:
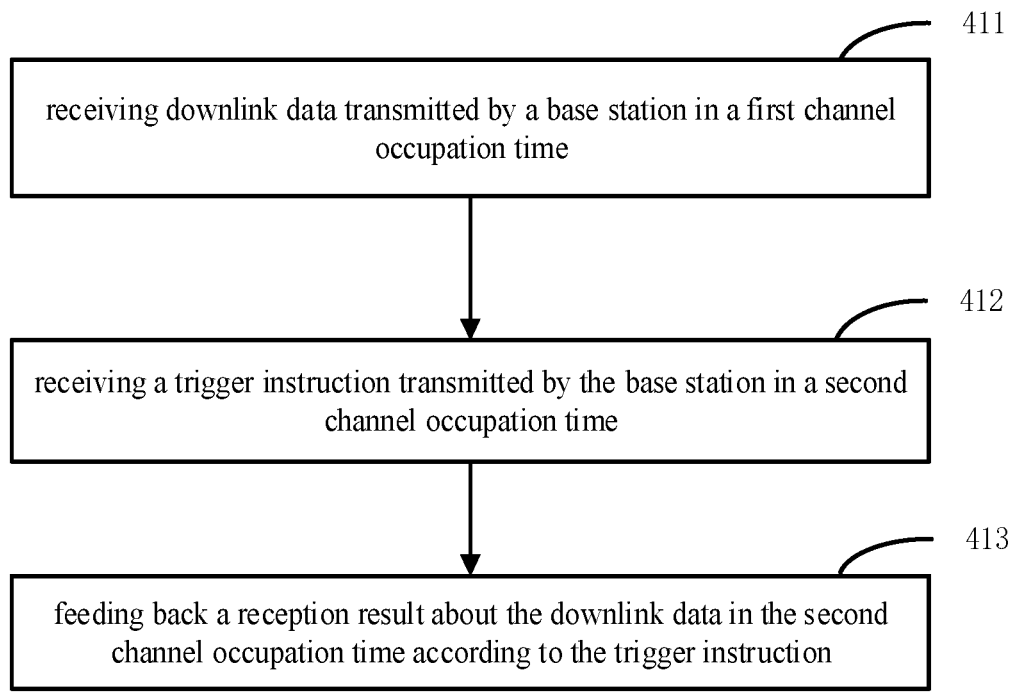
FIG. 4A is a flowchart illustrating a method for scheduling a hybrid automatic repeat request according to one or more examples of the present disclosure.

FIG. 4A is a flowchart illustrating a method for scheduling a hybrid automatic repeat request according to an example of the present disclosure. The method for scheduling a hybrid automatic repeat request is applied to a UE, which may be a mobile phone, a computer, a digital broadcasting terminal, a messaging device, a game console, a tablet device, a medical equipment, a fitness equipment, a personal digital assistant, etc. As illustrated in FIG. 4A, the method includes the following steps 411 to 413.

At step 411, downlink data transmitted by a base station is received in a first channel occupation time.

At step 412, a trigger instruction transmitted by the base station is received in a second channel occupation time, the trigger instruction including at least one of identifier information of the first channel occupation time and channel detection mechanism information of transmitting a reception result.

At step 413, a reception result about the downlink data is fed back in the second channel occupation time according to the trigger instruction.

In this example, the UE receives downlink data transmitted by the base station in the first channel occupation time, and feeds back the reception result about the downlink data in the second channel occupation time, to achieve a hybrid automatic repeat request across channel occupation time.

In this example, the UE learns the reception result corresponding to the downlink data in which channel occupation time is to be fed back according to identifier information of the first channel occupation time. The UE may perform channel detection according to the channel detection mechanism information indicated by the trigger instruction, so as to transmit the reception result.

Figure 4B:
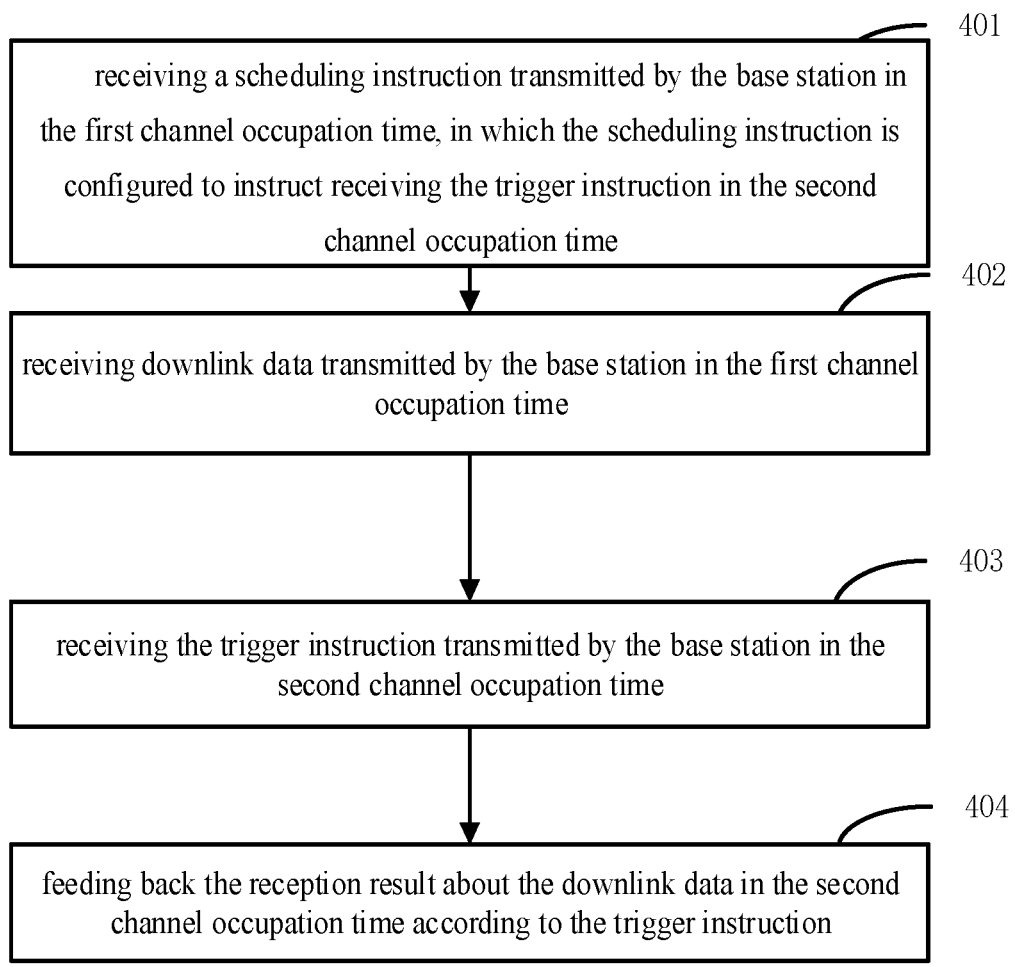
FIG. 4B is a flowchart illustrating a method for scheduling a hybrid automatic repeat request according to one or more examples of the present disclosure.

FIG. 4B is a flowchart illustrating a method for scheduling a hybrid automatic repeat request according to an example of the present disclosure. The method for scheduling a hybrid automatic repeat request is applied to a UE, which may be a mobile phone, a computer, a digital broadcasting terminal, a messaging device, a game console, a tablet device, a medical equipment, a fitness equipment, a personal digital assistant, etc. As illustrated in FIG. 4B, the method includes the following steps 401 to 404.

At step 401, a scheduling instruction transmitted by the base station is received in the first channel occupation time, in which the scheduling instruction is configured to instruct receiving the trigger instruction in the second channel occupation time.

At step 402, downlink data transmitted by the base station is received in the first channel occupation time.

At step 403, the trigger instruction transmitted by the base station is received in the second channel occupation time, in which the trigger instruction includes at least one of identifier information of the first channel occupation time and channel detection mechanism information of transmitting the reception result.

At step 404, the reception result about the downlink data is fed back in the second channel occupation time according to the trigger instruction.

In this example, the UE may learn that no reception result needs to be transmitted in the first channel occupation time after receiving the scheduling instruction. The UE normally receives downlink data transmitted by the base station in the first channel occupation time. Then, the UE waits to receive the trigger instruction in the second channel occupation time. After the trigger instruction is received, a channel detection is performed, so that to the reception result may be transmitted as early as possible.

In an example, the scheduling instruction includes at least one of a receiving mode of the trigger instruction, information of the second channel occupation time, and indication information configured to instruct the UE to feed back the reception result in the channel occupation time of receiving the trigger instruction.

In this example, when the scheduling instruction includes the receiving mode of the trigger instruction, the UE receives the trigger instruction according to the receiving mode in the scheduling instruction. When the scheduling instruction does not include the receiving mode of the trigger instruction, the UE receives the trigger instruction according to the receiving mode preconfigured in other ways.

In an example, the receiving mode of the trigger instruction includes at least one of: an aggregation level required by receiving the trigger instruction, a time-frequency resource position of receiving the trigger instruction and a signaling format of the trigger instruction.

Step 403 includes step B.

At step B, the trigger instruction transmitted by the base station is received at the time-frequency resource position according to the aggregation level in the second channel occupation time.

In this example, the UE receives the trigger instruction transmitted by the base station at the time-frequency resource position according to the aggregation level in the second channel occupation time according to the receiving mode indicated by the scheduling instruction. In this way, the trigger instruction may be better received, to reduce wait time and save power consumption of the device.

In an example, the method further includes step C1 to step C2.

At step C1, a radio network temporary identifier (RNTI) transmitted by the base station is received.

At step C2, the trigger instruction is descrambled according to the RNTI.

In this example, the trigger instruction may be descrambled with the RNTI, to improve an anti-interference performance of the trigger instruction, so that the trigger instruction may be better received. In addition, the UE may receive the RNTI in advance through the scheduling instruction or the RRC signaling.

There is no strict execution sequence for step C1 and step C2.

In an example, the trigger instruction further includes identifier information of a downlink packet.

In this example, the UE learns the reception result corresponding to which downlink packet needs to be fed back according to identifier information of the downlink packet.

In an example, the first channel occupation time includes one or more channel occupation time.

Step 404 includes step D.

At step D, the reception result about downlink data of the plurality of channel occupation time is fed back in the second channel occupation time.

In this example, after receiving downlink data of a plurality of first channel occupation time, the UE may feed back the reception result of the downlink data of the plurality of first channel occupation time in the second channel occupation time.

The following illustrates an implementation process in an example.

Figure 5:
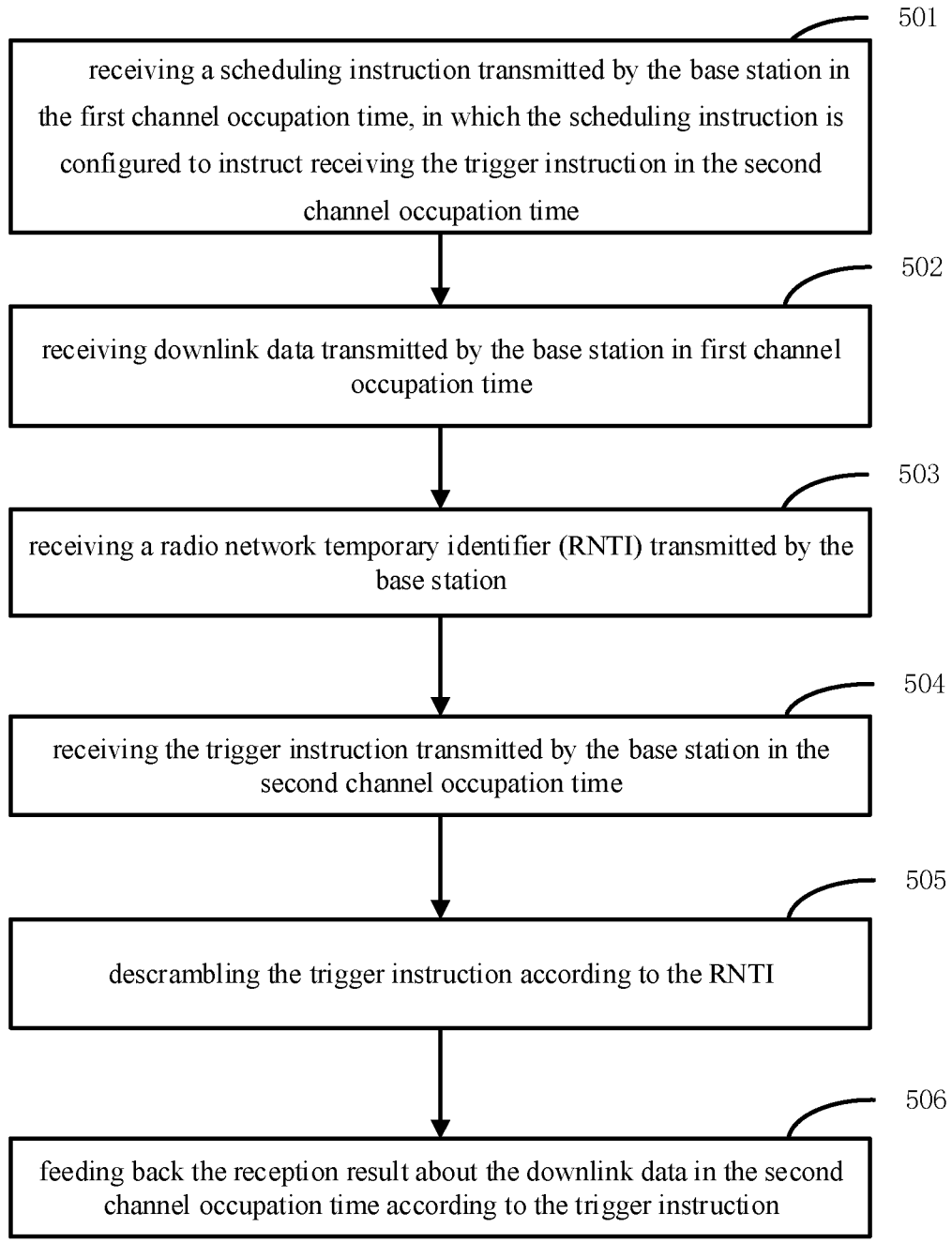
FIG. 5 is a flowchart illustrating a method for scheduling a hybrid automatic repeat request according to one or more examples of the present disclosure.

FIG. 5 is a flowchart illustrating a method for scheduling a hybrid automatic repeat request according to an example of the present disclosure. The method for scheduling a hybrid automatic repeat request is applied to a UE, which may be a mobile phone, a computer, a digital broadcasting terminal, a messaging device, a game console, a tablet device, a medical equipment, a fitness equipment, a personal digital assistant, etc. As illustrated in FIG. 5, the method includes the following steps 501 to 504.

At step 501, the scheduling instruction transmitted by the base station is received in the first channel occupation time, in which the scheduling instruction is configured to instruct receiving the trigger instruction in the second channel occupation time.

At step 502, downlink data transmitted by the base station is received in first channel occupation time.

At step 503, the radio network temporary identifier (RNTI) transmitted by the base station is received.

At step 504, the trigger instruction transmitted by the base station is received in the second channel occupation time, the trigger instruction including at least one of identifier information of the first channel occupation time and channel detection mechanism information of transmitting the reception result.

At step 505, the trigger instruction is descrambled according to the RNTI.

At step 506, the reception result about the downlink data is fed back in the second channel occupation time according to the trigger instruction.

The above examples may be combined freely according to actual requirement.

The followings are device examples of the present disclosure, which may be configured to implement the method examples of the present disclosure.

Figure 6A:
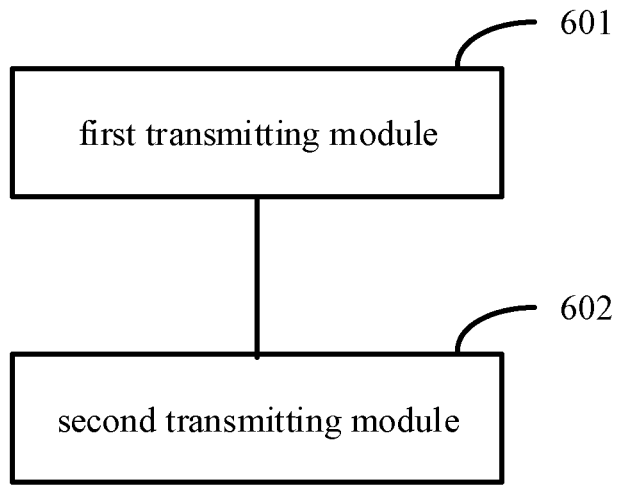
FIG. 6A is a block diagram illustrating a device for scheduling a hybrid automatic repeat request according to one or more examples of the present disclosure.

FIG. 6A is a block diagram illustrating a device for scheduling a hybrid automatic repeat request according to an example of the present disclosure. The device may be implemented as a part or all of an electronic device through software, hardware or their combination. The device is applied to a base station side. As illustrated in FIG. 6A, the device for scheduling a hybrid automatic repeat request includes a first transmitting module 601 and a second transmitting module 602.

The first transmitting module 601 is configured to transmit downlink data to a UE in a first channel occupation time.

The second transmitting module 602 is configured to transmit a trigger instruction to the UE in a second channel occupation time, in which the trigger instruction is configured to instruct the UE to feed back a reception result about the downlink data in the second channel occupation time, and the trigger instruction includes at least one of identifier information of the first channel occupation time and channel detection mechanism information of transmitting a reception result.

Figure 6B:
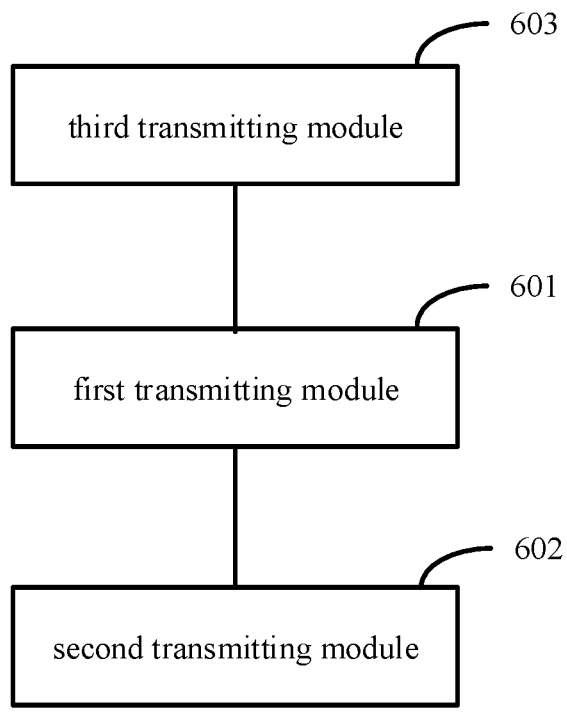
FIG. 6B is a block diagram illustrating a device for scheduling a hybrid automatic repeat request according to one or more examples of the present disclosure.

In an example, as illustrated in FIG. 6B, the device further includes a third transmitting module 603.

The third transmitting module 603 is configured to, before downlink data is transmitted to the UE, transmit a scheduling instruction to the UE in the first channel occupation time, in which the scheduling instruction is configured to instruct the UE to receive the trigger instruction in the second channel occupation time.

In an example, the scheduling instruction includes at least one of a receiving mode of the trigger instruction, information of the second channel occupation time, and indication information configured to instruct the UE to feed back the reception result in the channel occupation time of receiving the trigger instruction.

In an example, the receiving mode of the trigger instruction includes at least one of: an aggregation level required by receiving the trigger instruction, a time-frequency resource position of receiving the trigger instruction and a signaling format of the trigger instruction.

Figure 7:
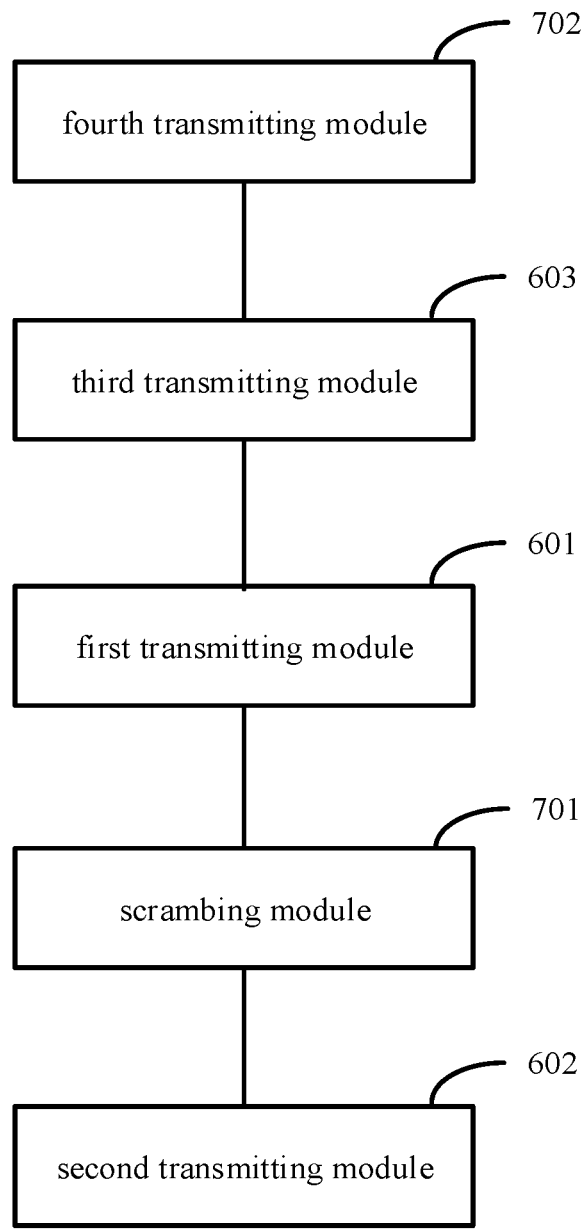
FIG. 7 is a block diagram illustrating a device for scheduling a hybrid automatic repeat request according to one or more examples of the present disclosure.

In an example, as illustrated in FIG. 7, the device further includes a scrambling module 701 and a fourth transmitting module 702.

The fourth transmitting module 702 is configured to, before the trigger instruction is transmitted to the UE, transmit a radio network temporary identifier (RNTI) to the UE.

The scrambling module 701 is configured to scramble the trigger instruction with the RNTI.

In an example, the trigger instruction further includes identifier information of a downlink packet.

In an example, the first channel occupation time includes one or more channel occupation time.

Figure 8A:
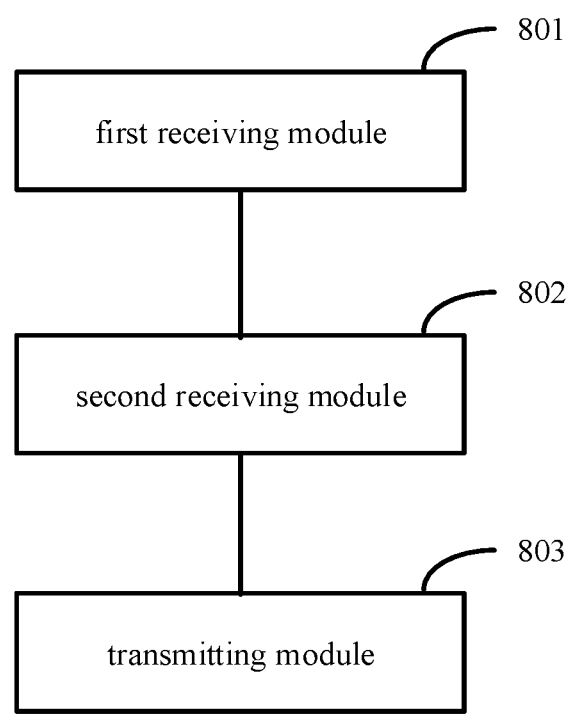
FIG. 8A is a block diagram illustrating a device for scheduling a hybrid automatic repeat request according to one or more examples of the present disclosure.

FIG. 8A is a block diagram illustrating a device for scheduling a hybrid automatic repeat request according to an example of the present disclosure. The device may be implemented as a part or all of an electronic device through software, hardware or their combination. The device is applied to a UE side. As illustrated in FIG. 8A, the device for scheduling a hybrid automatic repeat request includes a first receiving module 801, a second receiving module 802 and a transmitting module 803.

The first receiving module 801 is configured to receive downlink data transmitted by a base station in a first channel occupation time.

The second receiving module 802 is configured to receive a trigger instruction transmitted by the base station in a second channel occupation time, the trigger instruction including at least one of identifier information of the first channel occupation time and channel detection mechanism information of transmitting a reception result.

The transmitting module 803 is configured to feed back a reception result about the downlink data in the second channel occupation time according to the trigger instruction.

Figure 8B:
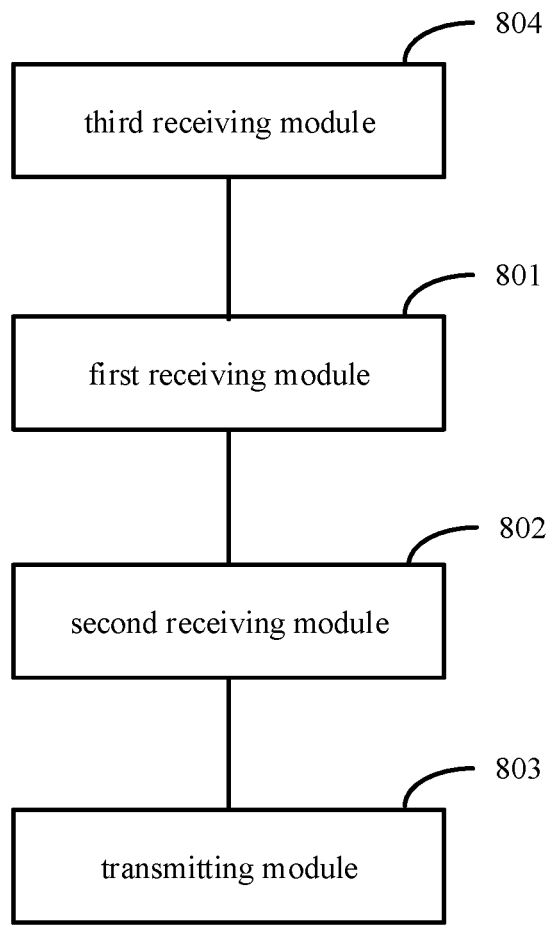
FIG. 8B is a block diagram illustrating a device for scheduling a hybrid automatic repeat request according to one or more examples of the present disclosure.

In an example, as illustrated in FIG. 8B, the device further includes a third receiving module 804.

The third receiving module 804 is configured to, before downlink data transmitted by the base station is received, receive a scheduling instruction transmitted by the base station in the first channel occupation time, in which the scheduling instruction is configured to instruct receiving the trigger instruction in the second channel occupation time.

In an example, the scheduling instruction includes at least one of a receiving mode of the trigger instruction, information of the second channel occupation time, and indication information configured to instruct the UE to feed back the reception result in the channel occupation time of receiving the trigger instruction.

In an example, the receiving mode of the trigger instruction includes at least one of: an aggregation level required by receiving the trigger instruction, a time-frequency resource position of receiving the trigger instruction and a signaling format of the trigger instruction.

Figure 9:
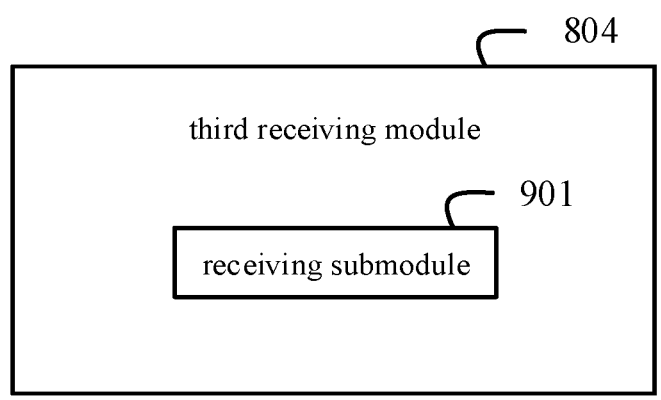
FIG. 9 is a block diagram illustrating a third receiving module according to one or more examples of the present disclosure.

As illustrated in FIG. 9, the second receiving module 802 includes a receiving submodule 901.

The receiving submodule 901 is configured to receive the trigger instruction transmitted by the base station at the time-frequency resource position according to the aggregation level in the second channel occupation time.

Figure 10:
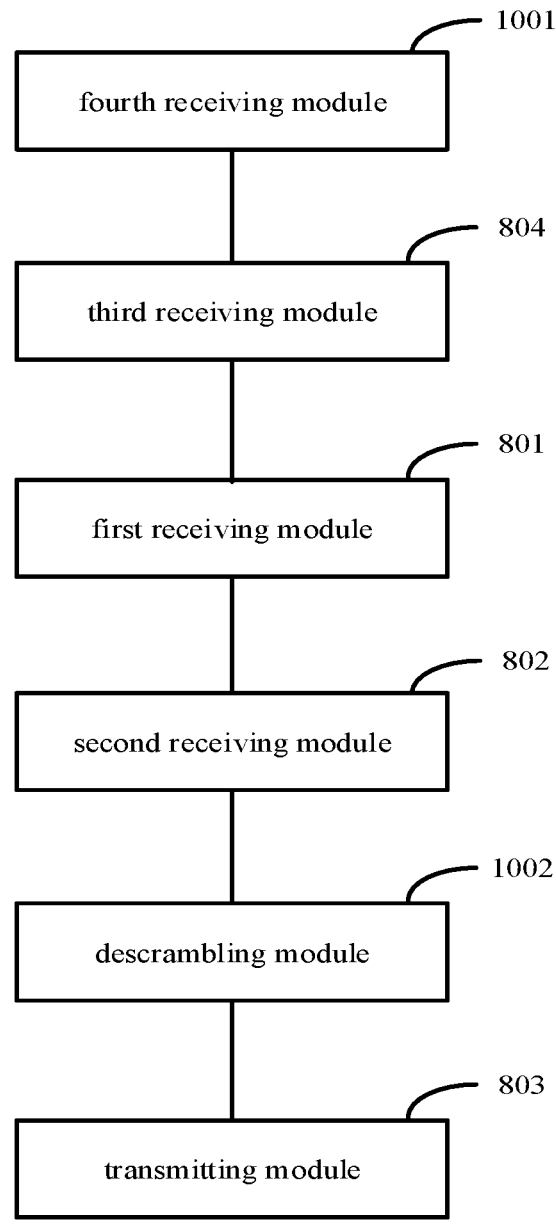
FIG. 10 is a block diagram illustrating a device for scheduling a hybrid automatic repeat request according to one or more examples of the present disclosure.

In an example, as illustrated in FIG. 10, the device further includes a fourth receiving module 1001 and a descrambling module 1002.

The fourth receiving module 1001 is configured to receive a radio network temporary identifier (RNTI) transmitted by the base station.

The descrambling module 1002 is configured to descramble the trigger instruction with the RNTI.

In an example, the trigger instruction further includes identifier information of a downlink packet.

In an example, the first channel occupation time includes one or more channel occupation time.

Figure 11:
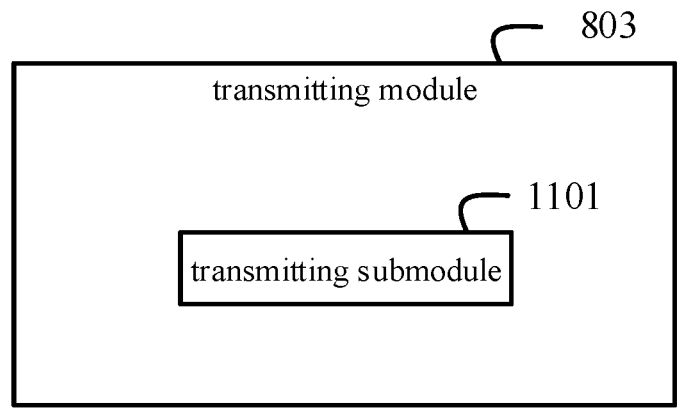
FIG. 11 is a block diagram illustrating a transmitting module according to one or more examples of the present disclosure.

As illustrated in FIG. 11, the transmitting module 803 includes a transmitting submodule 1101.

The transmitting submodule 1101 is configured to feed back the reception result about the downlink data of the plurality of channel occupation time in the second channel occupation time.

With regard to the device in the above examples, the specific way in which each module performs the operation has been described in detail in the examples of the method and will not be elaborated here.

Figure 12:
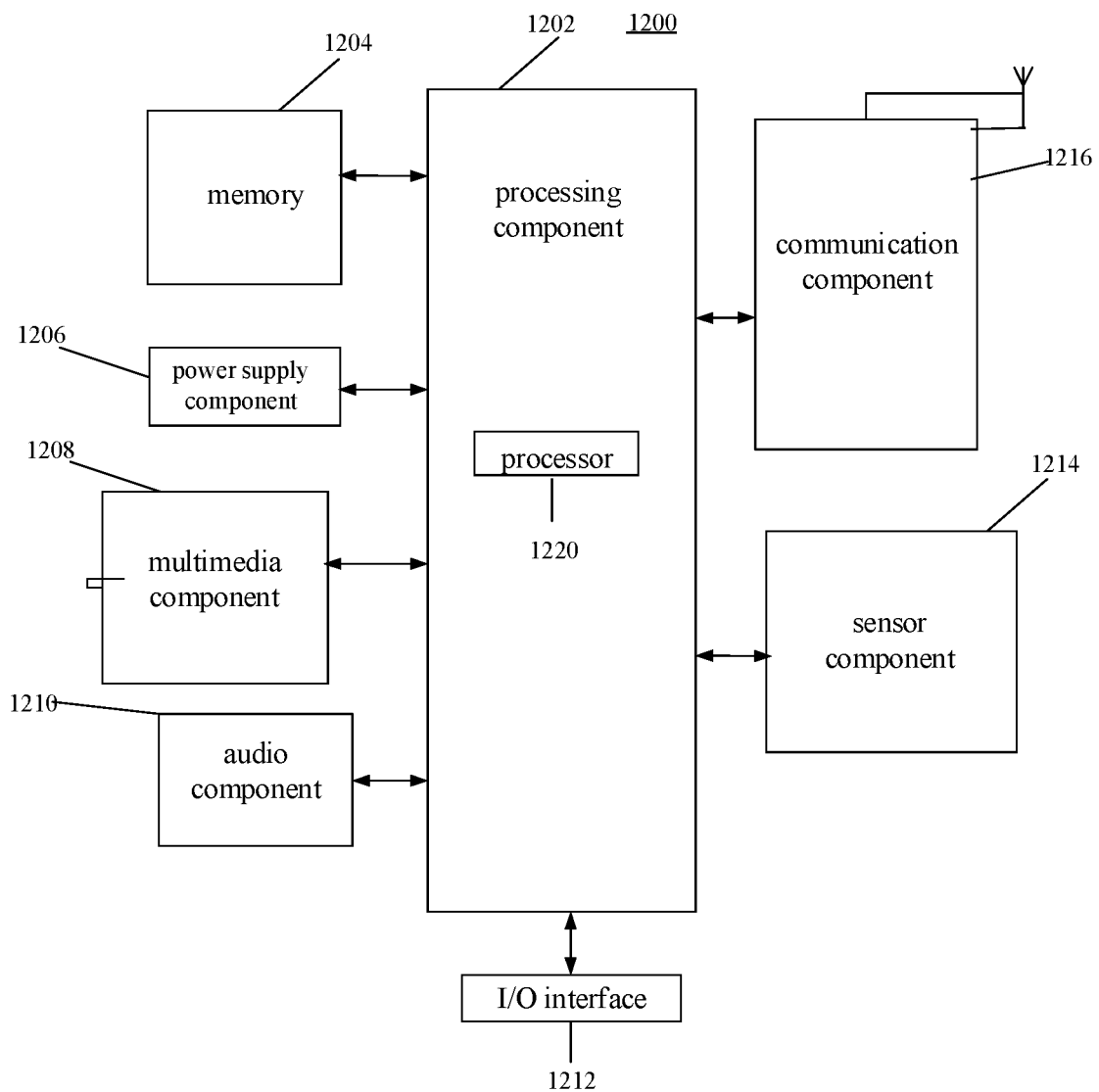
FIG. 12 is a block diagram illustrating a device suitable for scheduling a hybrid automatic repeat request according to one or more examples of the present disclosure.

FIG. 12 is a block diagram illustrating a device for scheduling a hybrid automatic repeat request according to an example of the present disclosure. For example, the device 1200 may be a mobile phone, a computer, a digital broadcasting terminal, a messaging device, a game console, a tablet device, a medical equipment, a fitness equipment, a personal digital assistant, etc.

The device 1200 may include one or more components of a processing component 1202, a memory 1204, a power supply component 1206, a multimedia component 1208, an audio component 1210, an input/output (I/O) interface 1212, a sensor component 1214, and a communication component 1216.

The processing component 1202 generally controls the whole operation of the device 1200, such as the operations related to display, phone call, data communication, camera operation and recording operation. The processing component 1202 may include one or more processors 1220 to perform instructions, to complete all or part of steps of the above method. In addition, the processing component 1202 may include one or more modules for the convenience of interaction between the processing component 1202 and other components. For example, the processing component 1202 may include a multimedia module for the convenience of interaction between the multimedia component 1208 and the processing component 1202.

The memory 1204 is configured to store all types of data to support the operation of the device 1200. Examples of the data include the instructions of any applications or methods operated on the device 1200, contact data, phone book data, messages, pictures, videos, etc. The memory 1204 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power supply component 1206 may provide power supply for all components of the device 1200. The power supply component 1206 may include power supply management system, one or more power supplies, and other units related to generating, managing and distributing power for the device 1200.

The multimedia component 1208 includes an output interface screen provided between the device 1200 and the user. In some examples, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some examples, the multimedia component 1208 includes a front camera and/or a rear camera. When the device 1200 is in operation mode, such as shooting mode or video mode, the front camera or the rear camera may receive the external multimedia data. Each front camera and rear camera may be a fixed optical lens system or an optical lens system with focal length and optical zoom capacity.

The audio component 1210 is configured as output and/or input signal. For example, the audio component 1210 includes a microphone (MIC). When the device 1200 is in operation mode, such as call mode, record mode, and speech recognition mode, the microphone is configured to receive the external audio signals. The audio signals received may be further stored in the memory 1204 or transmitted via the communication component 1216. In some examples, the audio component 1210 further includes a speaker configured to output an audio signal.

The I/O interface 1212 provides an interface for the processing component 1202 and the peripheral interface module, and the peripheral interface module may be a keyboard, a click wheel, a button, etc. The buttons may include but not limited to a home button, a volume button, a start button and a lock button.

The sensor component 1214 includes one or more sensors, configured to provide various aspects of status assessment for the device 1200. For example, the sensor component 1214 may detect the on/off state of the device 1200 and the relative positioning of the component. For example, the component is a display and a keypad of the device 1200. The sensor component 1214 may further detect the location change of the device 1200 or one component of the device 1200, the presence or absence of contact between the user and the device 1200, the orientation or acceleration/deceleration of the device 1200, and the temperature change of the device 1200. The sensor component 1214 may include a proximity sensor, which is configured to detect the existence of the objects nearby without any physical contact. The sensor component 1214 may further include a light sensor such as CMOS or CCD image sensor, which is configured to use in imaging applications. In some examples, the sensor component 1214 may further include an acceleration transducer, a gyroscope sensor, a magnetic sensor, a pressure sensor or a temperature sensor.

The communication component 1216 is configured for the convenience of wire or wireless communication between the device 1200 and other devices. The device 1200 may access wireless networks based on communication standard, such as WiFi, 2G or 3G, or their combination. In an example of the present disclosure, the communication component 1216 receives broadcast signals or broadcast-related information from an external broadcast management system via a broadcast channel. In an example of the present disclosure, the communication component 1216 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth (BT) technology and other technologies.

In an example of the present disclosure, the device 1200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example of the present disclosure, a non-temporary computer readable storage medium is further provided, for example, the memory 1204 including instructions, in which the instructions may be executed by the processor 1220 of the device 1200 to complete the above methods. For example, the non-temporary computer readable storage medium may be a ROM, a random access memory (RAM), a CD-ROM, a magnetic tape, a floppy disk, an optical data storage device, etc.

In an example of the present disclosure, a device for scheduling a hybrid automatic repeat request is provided. The device includes a processor; a memory configured to store instructions executable by the processor; in which, the processor is configured to: receive downlink data transmitted by a base station in a first channel occupation time; receive a trigger instruction transmitted by the base station in a second channel occupation time, the trigger instruction including at least one of identifier information of the first channel occupation time and channel detection mechanism information of transmitting a reception result; and feeding back a reception result about the downlink data in the second channel occupation time according to the trigger instruction.

The above processor may be further configured as: the scheduling instruction includes at least one of a receiving mode of the trigger instruction, information of the second channel occupation time, and indication information configured to instruct the UE to feed back the reception result in the channel occupation time of receiving the trigger instruction.

The above processor may be further configured as: the receiving mode of the trigger instruction includes at least one of: an aggregation level required by receiving the trigger instruction, a time-frequency resource position of receiving the trigger instruction and a signaling format of the trigger instruction; receiving the trigger instruction transmitted by the base station in second channel occupation time includes: receiving the trigger instruction transmitted by the base station at the time-frequency resource position according to the aggregation level in the second channel occupation time.

The above processor may be further configured as: the method further includes: receiving a radio network temporary identifier (RNTI) transmitted by the base station; descrambling the trigger instruction according to the RNTI.

The above processor may be further configured as: the trigger instruction further includes identifier information of a downlink packet.

The above processor may be further configured as: the first channel occupation time includes one or more channel occupation time; when the first channel occupation time includes a plurality of channel occupation time, feeding back the reception result about the downlink data in the second channel occupation time includes: feeding back the reception result about the downlink data of the plurality of channel occupation time in the second channel occupation time.

A computer readable storage medium is further provided. When the instruction in the computer readable storage medium is executed by the processor of the device, the device is caused to execute the above method for scheduling a hybrid automatic repeat request. The method includes: receiving downlink data transmitted by a base station in a first channel occupation time; receiving a trigger instruction transmitted by the base station in a second channel occupation time, the trigger instruction including at least one of identifier information of the first channel occupation time and channel detection mechanism information of transmitting a reception result; feeding back a reception result about the downlink data in the second channel occupation time according to the trigger instruction.

The instruction in the storage medium may further include: the scheduling instruction includes at least one of a receiving mode of the trigger instruction, information of the second channel occupation time, and indication information configured to instruct the UE to feed back the reception result in the channel occupation time of receiving the trigger instruction.

The instruction in the storage medium may further include: the receiving mode of the trigger instruction includes at least one of: an aggregation level required by receiving the trigger instruction, a time-frequency resource position of receiving the trigger instruction and a signaling format of the trigger instruction; receiving the trigger instruction transmitted by the base station in second channel occupation time includes: receiving the trigger instruction transmitted by the base station at the time-frequency resource position according to the aggregation level in the second channel occupation time.

The instruction in the storage medium may further include: the method further includes: receiving a radio network temporary identifier (RNTI) transmitted by the base station; descrambling the trigger instruction according to the RNTI.

The instruction in the storage medium may further include: the trigger instruction further includes identifier information of a downlink packet.

The instruction in the storage medium may further include: the first channel occupation time includes one or more channel occupation time; when the first time-frequency resource includes a plurality of channel occupation time, feeding back the reception result about the downlink data in the second channel occupation time includes: feeding back the reception result about the downlink data of the plurality of channel occupation time in the second channel occupation time.

Figure 13:
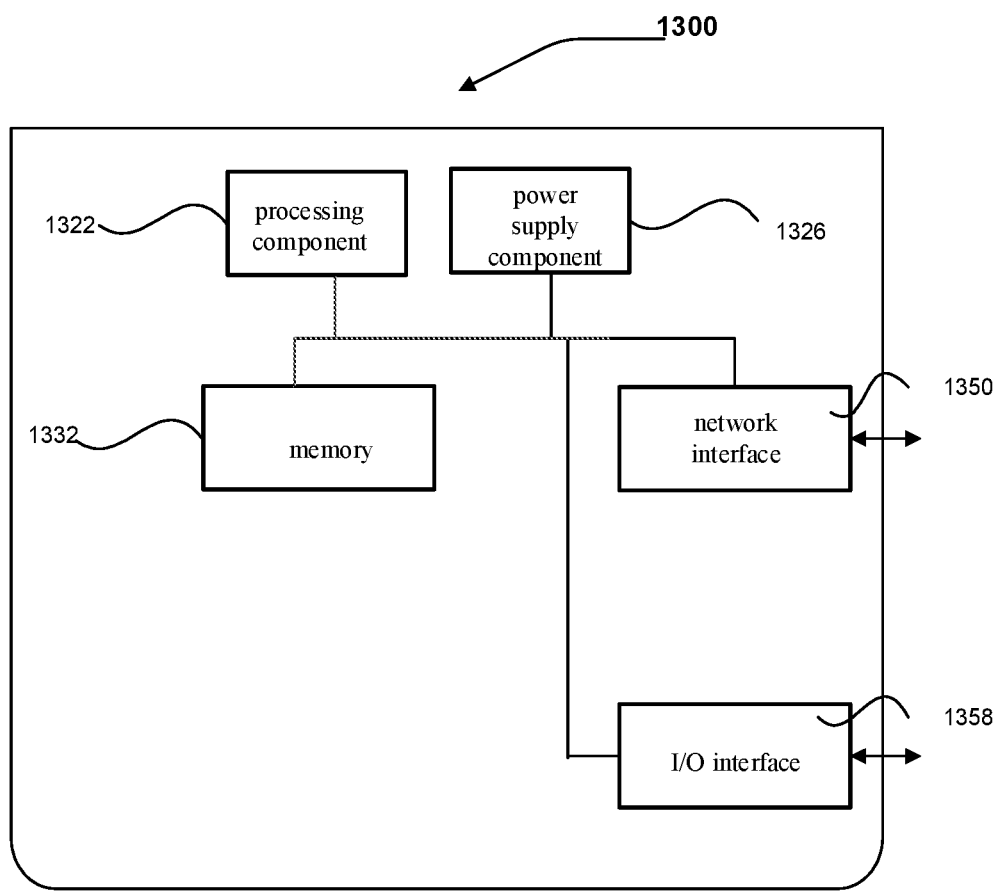
FIG. 13 is a block diagram illustrating a device suitable for scheduling a hybrid automatic repeat request according to one or more examples of the present disclosure.

FIG. 13 is a block diagram illustrating a device 1300 for synchronizing data according to an example of the present disclosure. For example, the device 1300 may be provided as a computer. Referring to FIG. 13, the device 1300 includes a processing component 1322, which further include one or more processors, and memory resources represented by the memory 1332, which are configured to store instructions executable by the processing component 1322, for example, application programs. The application programs stored in the memory 1332 may include one or more modules each of which corresponds to a set of instructions. In addition, the processing component 1322 is configured to execute instructions, to implement the above method.

The device 1300 may further include one power supply component 1326 configured to execute power management of the device 1300, one wired or wireless network interface 1350 configured to connect the device 1300 to a network, and one input/output (I/O) interface 1358. The device 1300 may operate an operating system stored in the memory 1332, for example, Windows Server™, Mac OS X™, Unix™, Linux™, FreeBSD™.

In an example of the present disclosure, a device for scheduling a hybrid automatic repeat request is provided. The device includes: a processor; a memory configured to store instructions executable by the processor. The processor is configured to: transmit downlink data to a UE in a first channel occupation time; transmit a trigger instruction to the UE in a second channel occupation time, in which the trigger instruction is configured to instruct the UE to feed back a reception result about the downlink data in the second channel occupation time, and the trigger instruction includes at least one of identifier information of the first channel occupation time and channel detection mechanism information of transmitting the reception result.

The above processor may be further configured as: the scheduling instruction includes at least one of a receiving mode of the trigger instruction, information of the second channel occupation time, and indication information configured to instruct the UE to feed back the reception result in the channel occupation time of receiving the trigger instruction.

The above processor may be further configured as: the receiving mode of the trigger instruction includes at least one of: an aggregation level required by receiving the trigger instruction, a time-frequency resource position of receiving the trigger instruction and a signaling format of the trigger instruction.

The above processor may be further configured as: the method further includes: before transmitting the trigger instruction to the UE, scrambling the trigger instruction with the RNTI; transmitting the RNTI to the UE.

The above processor may be further configured as: the trigger instruction further includes identifier information of a downlink packet.

The above processor may be further configured as: the first channel occupation time includes one or more channel occupation time.

A computer readable storage medium is further provided. When the instructions in the computer readable storage medium are executed by the processor of the device, the device is caused to implement the above method for scheduling a hybrid automatic repeat request. The method includes: transmitting downlink data to a UE in a first channel occupation time; transmitting a trigger instruction to the UE in a second channel occupation time, in which the trigger instruction is configured to instruct the UE to feed back a reception result about the downlink data in the second channel occupation time, and the trigger instruction includes at least one of identifier information of the first channel occupation time and channel detection mechanism information of transmitting the reception result.

The instructions in the storage medium may further include: the scheduling instruction includes at least one of a receiving mode of the trigger instruction, information of the second channel occupation time, and indication information configured to instruct the UE to feed back the reception result in the channel occupation time of receiving the trigger instruction.

The instructions in the storage medium may further include: the receiving mode of the trigger instruction includes at least one of: an aggregation level required by receiving the trigger instruction, a time-frequency resource position of receiving the trigger instruction and a signaling format of the trigger instruction.

The instructions in the storage medium may further include: the method further includes: before transmitting the trigger instruction to the UE, scrambling the trigger instruction with the RNTI; transmitting the RNTI to the UE.

The instructions in the storage medium may further include: the trigger instruction further includes identifier information of a downlink packet.

The instructions in the storage medium may further include: the first channel occupation time includes one or more channel occupation time.

According to another aspect of the present disclosure, a device for scheduling a hybrid automatic repeat request is provided. The device includes: a processor; a memory configured to store instructions executable by the processor; in which, the processor is configured to: receive downlink data transmitted by a base station in a first channel occupation time; receive a trigger instruction transmitted by the base station in a second channel occupation time, the trigger instruction including at least one of identifier information of the first channel occupation time and channel detection mechanism information of transmitting a reception result; and feeding back a reception result about the downlink data in the second channel occupation time according to the trigger instruction.

According to another aspect of the present disclosure, a computer readable storage medium with computer instructions stored thereon is provided, in which the instructions are configured to implement the method at the base station side when executed by the processor.

According to yet another aspect of the present disclosure, a computer readable storage medium with computer instructions stored thereon is provided, in which the instructions are configured to implement the method at the UE side when executed by the processor.

After considering the specification and practicing the disclosure herein, those skilled in the art will easily think of other examples of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the examples are to be regarded as exemplary only, and the true scope and spirit of the present application are referred to the appended claims.

It should be understood that the present invention is not limited to the precise structure described above and shown in the drawings, and various modifications and changes may be made without departing from its scope. The scope of the present application is only limited by the appended claims.

What is claimed is:

1. A method for scheduling a hybrid automatic repeat request, comprising:

transmitting, by a base station, downlink data to a user equipment(UE) during a first channel occupation time, wherein the UE does not feed back a reception result about the downlink data in the first channel occupation time; and transmitting, by the base station, a trigger instruction to the UE during a second channel occupation time, wherein the trigger instruction is configured to instruct the UE to feed back the reception result about the downlink data during the second channel occupation time, and the trigger instruction comprises channel detection mechanism information of transmitting the reception result.

2. The method of claim 1, further comprising:

before transmitting downlink data to the UE in the first channel occupation time, transmitting a scheduling instruction to the UE during the first channel occupation time, wherein the scheduling instruction is configured to instruct the UE to receive the trigger instruction during the second channel occupation time.

3. The method of claim 2, wherein, the scheduling instruction comprises at least one of: a receiving mode of the trigger instruction, information of the second channel occupation time, or indication information configured to instruct the UE to feed back the reception result during channel occupation time of receiving the trigger instruction.

4. The method of claim 3, wherein, the receiving mode of the trigger instruction comprises at least one of: an aggregation level required by receiving the trigger instruction, a time-frequency resource position of receiving the trigger instruction, or a signaling format of the trigger instruction.

5. The method of claim 1, further comprising:
before transmitting the trigger instruction to the UE, transmitting a radio network temporary identifier (RNTI) to the UE; and
scrambling the trigger instruction with the RNTI.

6. The method of claim 1, wherein, the trigger instruction further comprises identifier information of a downlink packet.

7. The method of claim 1, wherein, the first channel occupation time comprises one or more channel occupation time.

8. A method for scheduling a hybrid automatic repeat request, comprising:
receiving, by a user equipment (UE), downlink data transmitted by a base station during a first channel occupation time, wherein the UE does not feed back a reception result about the downlink data in the first channel occupation time;
receiving, by the UE, a trigger instruction transmitted by the base station during a second channel occupation time, the trigger instruction comprising channel detection mechanism information of transmitting the reception result; and feeding back the reception result about the downlink data during the second channel occupation time according to the trigger instruction.

9. The method of claim 8, further comprising:
before receiving the downlink data transmitted by the base station during the first channel occupation time, receiving a scheduling instruction transmitted by the base station during the first channel occupation time, wherein the scheduling instruction is configured to instruct receiving the trigger instruction during the second channel occupation time.

10. The method of claim 9, wherein, the scheduling instruction comprises at least one of: a receiving mode of the trigger instruction, information of the second channel occupation time, or indication information configured to instruct the UE to feed back the reception result during channel occupation time of receiving the trigger instruction.

11. The method of claim 10, wherein, the receiving mode of the trigger instruction comprises at least one of: an aggregation level required by receiving the trigger instruction, a time-frequency resource position of receiving the trigger instruction, or a signaling format of the trigger instruction;
receiving the trigger instruction transmitted by the base station during the second channel occupation time comprises:
receiving the trigger instruction transmitted by the base station at the time-frequency resource position according to the aggregation level in the second channel occupation time.

12. The method of claim 8, further comprising:
receiving a radio network temporary identifier(RNTI) transmitted by the base station; and
descrambling the trigger instruction according to the RNTI.

13. The method of claim 8, wherein, the trigger instruction further comprises identifier information of a downlink packet.

14. The method of claim 8, wherein, the first channel occupation time comprises one or more channel occupation time;
when the first channel occupation time comprises a plurality of channel occupation time, feeding back the reception result about the downlink data during the second channel occupation time comprises:
feeding back the reception result about the downlink data of the plurality of channel occupation time during the second channel occupation time.

15. A device for scheduling a hybrid automatic repeat request, applied to a user equipment (UE) comprising:
a processor; and
a memory, configured to store instructions executable by the processor,
wherein the processor is configured to execute the instructions stored in the memory, so as to:
receive downlink data transmitted by a base station during a first channel occupation time, wherein the UE does not feed back a reception result about the downlink data in the first channel occupation time;
receive a trigger instruction transmitted by the base station during a second channel occupation time, the trigger instruction comprising channel detection mechanism information of transmitting the reception result; and feed back the reception result about the downlink data during the second channel occupation time according to the trigger instruction.

16. The device of claim 15, wherein the processor is further configured to:
before receiving the downlink data transmitted by the base station, receive a scheduling instruction transmitted by the base station during the first channel occupation time, wherein the scheduling instruction is configured to instruct receiving the trigger instruction in the second channel occupation time.

17. The device of claim 16, wherein, the scheduling instruction comprises at least one of: a receiving mode of the trigger instruction, information of the second channel occupation time, or indication information configured to instruct the UE to feed back the reception result in the channel occupation time of receiving the trigger instruction.

18. The device of claim 17, wherein the receiving mode of the trigger instruction comprises at least one of: an aggregation level required by receiving the trigger instruction, a time-frequency resource position of receiving the trigger instruction, or a signaling format of the trigger instruction; and
the processor is configured to:
receive the trigger instruction transmitted by the base station at the time-frequency resource position according to the aggregation level in the second channel occupation time.

19. The device of claim 15, wherein the processor is further configured to:
receive a radio network temporary identifier (RNTI) transmitted by the base station; and
descramble the trigger instruction with the RNTI.

20. The device of claim 15, wherein the first channel occupation time comprises one or more channel occupation time; and
the processor is configured to:
feed back the reception result about the downlink data of the plurality of channel occupation time during the second channel occupation time.

* * * * *